United States Patent [19]
Stevenson

[11] Patent Number: 6,021,998
[45] Date of Patent: Feb. 8, 2000

[54] POWER ACTUATOR FOR A ROTARY VALVE

[75] Inventor: Paul Dwight Stevenson, Ann Arbor, Mich.

[73] Assignee: General Motors Corporation, Detroit, Mich.

[21] Appl. No.: 09/105,405

[22] Filed: Jun. 26, 1998

[51] Int. Cl.[7] .................................................. F16K 31/12
[52] U.S. Cl. ............................................. 251/59; 251/251
[58] Field of Search ............................... 251/59, 251, 304

[56] References Cited

U.S. PATENT DOCUMENTS

| | | | |
|---|---|---|---|
| 2,443,333 | 6/1948 | Tucker | 251/59 X |
| 2,811,834 | 11/1957 | Shafer et al. | 251/59 X |
| 5,137,252 | 8/1992 | White | 251/59 X |
| 5,690,144 | 11/1997 | Takahashi | 251/59 X |
| 5,879,258 | 3/1999 | Stevenson et al. | 475/135 |

*Primary Examiner*—Kevin Lee
*Attorney, Agent, or Firm*—Michael J. Bridges

[57] ABSTRACT

A rotary power actuator has an oscillating input member and an intermittent rotary output member. A controllable one-way mechanism, which is drivingly connected between the oscillating input member and the rotary output member, accommodates the intermittent motion of the output member. The input member and the one-way mechanism are controlled by hydraulic fluid during power actuation. The input member is returned to a neutral central position by a mechanism system consisting of a spring and ball arrangement while the one-way is maintained in the overrun condition. The output member is connected with a rotary valve member which is stepped to selected valve positions when the actuator is powered and retains the selected valve position when the input member is returned to the neutral central position.

3 Claims, 1 Drawing Sheet

POWER ACTUATOR FOR A ROTARY VALVE

TECHNICAL FIELD

This invention relates to rotary actuators, and more particularly, to such actuators for powering a rotary valve.

BACKGROUND OF THE INVENTION

Valves used in automatic transmissions for controlling the range selection by the operator can be linear or rotary. A number of such rotary valves are known. In particular, a rotary valve is shown in U.S. Ser. No. 08/934,423, filed Sep. 19, 1997, in the name of Stevenson and Koenig and assigned to the assignee of this invention.

These rotary valves are generally driven by an electrical stepper motor. The stepper motor has control mechanisms which permit it to step a predetermined angular displacement with each control impulse. As a general rule, the stepper motors are of a fairly large size and therefore require space adjacent the valve body within the transmission housing. Since space is at a premium within the housing, it is desired to have a smaller, more compact structure.

SUMMARY OF THE INVENTION

It is an object of the present invention to provide an improved actuator for driving a rotary valve.

In one aspect of this invention, an actuator has a hydraulically driven oscillating member or arm which drives an input portion of a one-way mechanism.

In another aspect of this invention, the one-way mechanism has an output member drivingly connected with a valve member, such that when the actuator arm is driven, the output member rotates in unison to thereby drive the valve.

In another aspect of this invention, the actuator arm is permitted to return to a neutral position under the influence of a mechanical mechanism.

In a further aspect of this invention, while the actuator arm is returned to the neutral position, the output member is retained in the selected position.

In yet a further aspect of this invention, a hydraulic circuit is connected with both the actuator drive arm and the one-way mechanism to control both actuation of the drive arm and to control the power transmitting direction of the one-way mechanism.

DESCRIPTION OF AN EXEMPLARY EMBODIMENT

Figure 1:
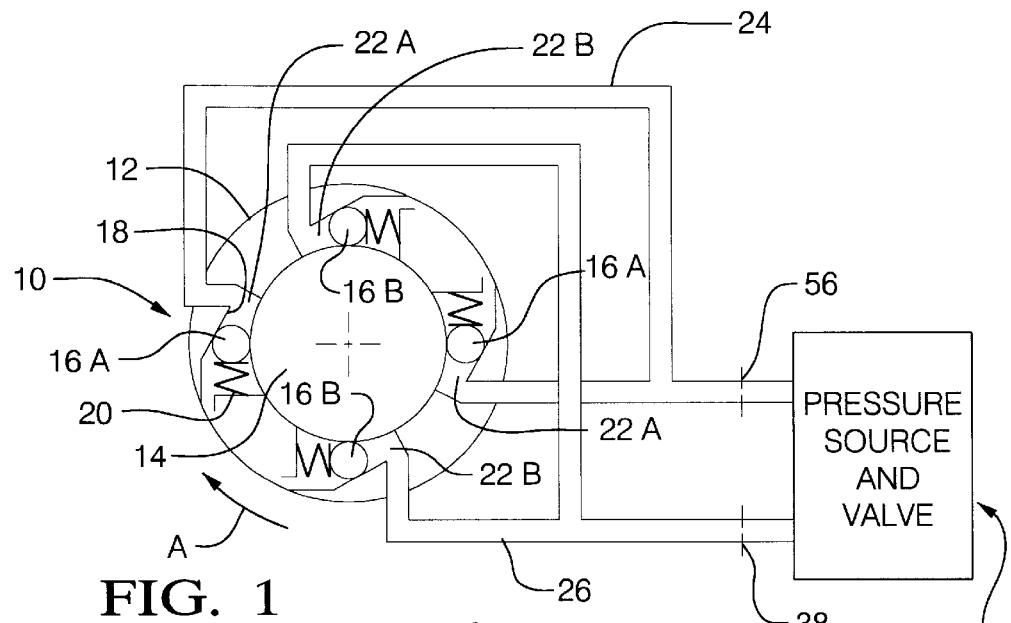
FIG. 1 is a schematic representation of a controllable one-way drive mechanism utilized with the present invention.

Referring to the drawings, wherein like characters represent the same or corresponding parts throughout the several views, there is seen in FIG. 1 a one-way mechanism 10, which has an input drive hub 12, an output shaft or hub 14 and a plurality of rollers 16A, 16B which are urged into cam surfaces 18 formed on the drive hub 12 by spring members 20. Each of the rollers 16A, 16B cooperates with the cam 18 and shaft 14 to provide hydraulic chambers 22A and 22B.

The hydraulic chambers 22A are connected with an upshift passage 24 and hydraulic chambers 22B are connected with a downshift passage 26. The passages 24 and 26 are connected with a conventional pressure source and control valve assembly 28. The pressure source and control valve assembly are well known conventional systems utilized in automatic shifting power transmissions. The pressure source is preferably a positive displacement pump and the valve mechanisms are generally solenoid controlled valve members which provide fluid distribution as directed by the control mechanism within the pressure source and valve mechanism 28.

When the upshift passage 24 is pressurized from the control valve 28, the rollers 16A are unseated because of fluid flow passed the respective rollers, such that torque cannot be transmitted between the drive hub 12 and the shaft 14. However, if the drive hub 12 is driven in the direction of Arrow A, the rollers 16B will transmit torque and power between the drive hub 12 and the shaft 14.

When the downshift passage 26 is pressurized, the chambers 22B will be pressurized thereby preventing contact of the rollers 16B with their respective cam surfaces, such that power cannot be transmitted through the rollers 16B. If, in this condition, the drive hub 12 is rotated in a direction opposite to Arrow A, the rollers 16A will be effective to transmit torque and power between the drive hub 12 and the shaft 14.

Figure 2:
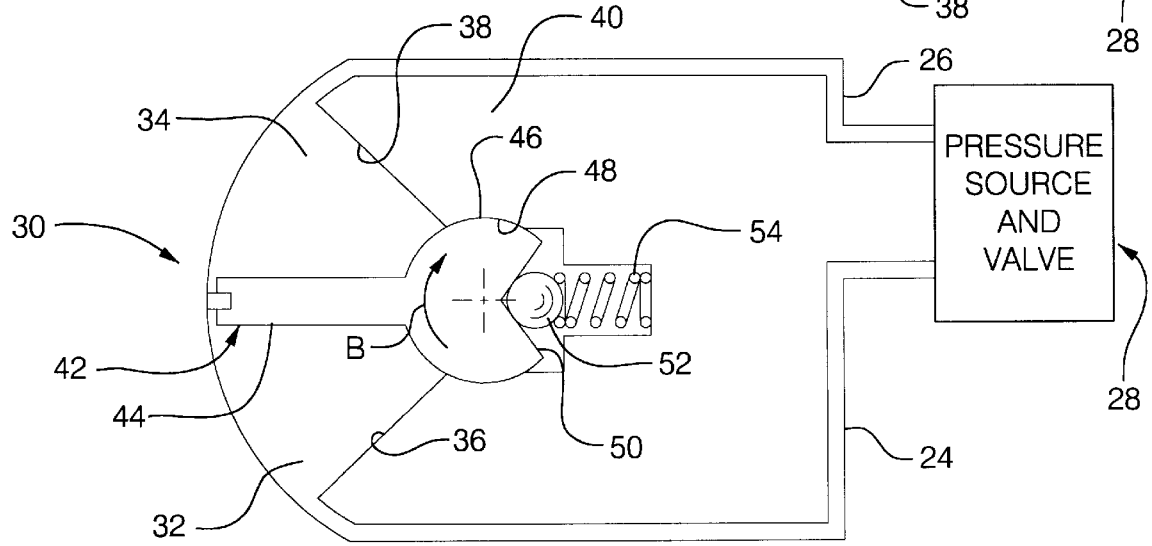
FIG. 2 is a diagrammatic representation of an actuator utilized with the present invention.

An actuator assembly 30 is shown in FIG. 2. This assembly 30 includes a pair of chambers 32 and 34 which are formed by respective walls 36 and 38 of a housing 40. An actuator arm 42 consisting of a drive arm 44 and an output member 46 is disposed within the housing 40. The output member 46 is rotatably mounted in a socket 48 while the arm 44 is disposed within the housing 40 to divide the chambers 32 and 34. The output member 46 has a V-shaped cam surface 50 against which a ball 52 is seated by a spring 54. As will be evident later, the ball 52 and spring 54, in combination with the cam 50, is effective to return the actuator arm 42 to a neutral center position shown.

The chamber 34 is in fluid communication with the downshift passage 26 and the chamber 32 is in fluid communication with the upshift passage 24. Thus, when the upshift passage 24 is pressurized, the drive arm 44 will be pressurized by fluid in the chamber 32 thereby urging the drive arm 44 to rotate in the direction of Arrow B.

When the downshift passage 26 is pressurized, the chamber 34 will be pressurized to urge the drive arm 44 to rotate opposite to the direction of Arrow B. In either event, when the pressure of chamber 32 or 34 is relieved, the ball 52 and spring 54 will act with the cam surface 50 to force the arm 44 back to the center position shown.

The output member 46 is drivingly connected with the hub 12. Thus, as the chamber 32 is activated or pressurized, the drive arm 44 will rotate the drive hub 12 in the direction of Arrow A resulting in the drive connection through the rollers 16B with the shaft 14. However, when the pressure in chamber 32 is released, that is, the passage 24 is exhausted, the arm 44 will be driven back to the neutral central position by the ball 52 and spring 54. While the arm is being driven back to the central position, the pressure in chambers 22A will continue to be held at a pressure sufficient to maintain the rollers 16A offset from their respective cams against their respective springs 20.

The spring 54 has sufficient compressed force therein to generate a pressure of approximately 10 to 12 psi, in the respective passages 24 or 26 during the return stroke of the arm 44, while the springs 20 will hold the rollers 16A and 16B away from their respective cams 18 until the pressure in their respective chambers 22A and 22B is three psi or less.

Thus, it can be appreciated that the actuator arm 42 will be returned to its central position prior to the pressure being released on the respective deactivated roller 16A or 16B.

Figure 3:
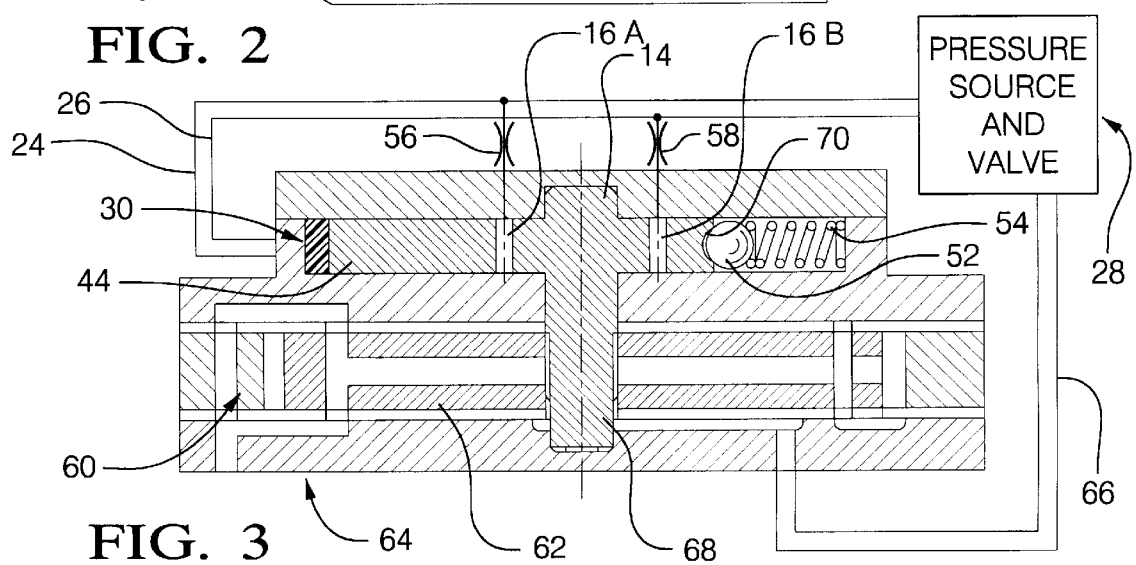
FIG. 3 is a sectional view of a diagrammatic representation of the combination of the one-way device shown in FIG. 1, the actuator shown in FIG. 2, and a rotary valve.

The upshift passage 24 has formed therein a restriction 56 and the downshift passage 26 has formed therein a restriction 58. As seen in FIG. 3, the restrictions 56 and 58 are downstream of the connections of passages 24 and 26 with the actuator assembly 30. The restrictions 56 and 58 are effective to reduce the amount of leakage or fluid which bypasses the rollers 16A and 16B during actuation of the valve mechanism.

A rotary valve mechanism 60 is shown in FIG. 3. This rotary valve mechanism includes a rotary valve 62 which is rotatably supported in a housing 64. The housing 64 is in fluid communication with the pressure source and control 28 through a passage 66. There will, of course, be more than one passage or fluid connection between the pressure source 28 and the rotary valve 62. For simplicity, a single passage 66 is shown. The rotary valve 62 can be constructed in accordance with that disclosed in U.S. Ser. No. 08/934,432, filed Sep. 19, 1997 and assigned to the assignee of this application.

The valve 62 is drivingly connected with a shaft 68 which is connected with the shaft 14 of the one-way device 10. The actuator 30 is shown as being incorporated directly into the drive hub 12 surrounding the rollers 16A and 16B. The ball 52 and spring 54 are shown in FIG. 3 acting in cam 50 which has a groove portion 70 in which the ball 52 will roll during its actuation of the drive arm 44.

Preferably, the rotary valve 60 has a conventional detent assembly which will hold the valve in the position selected by the actuator 30 while the actuator arm 42 is returned to the neutral position. The rotary valve 62 is positionable to a plurality of range positions normally associated with automatic transmissions, such as Park, Reverse, Neutral, Drive and various forward drive conditions, such as Low, Second and Third. Assuming the valve 62 has the transmission condition for Neutral, and the driver wishes to select a forward drive, the upshift passage will be energized and the actuator 30 would step the valve 62 one drive notch forward to thereby position the rotary valve 62 in the Low forward gear.

Once this gear has been attained, the pressure in chamber 32 will be released and arm 44 will be returned to the central position and the one-way mechanism 10 will be depressurized. If an upshift to Second forward gear is desired, again the upshift passage will be pressurized, the one-way mechanism would respond to the movement of the arm 44 to step the valve 62 to a Second gear position. As with the Low gear, when the chamber 32 is depressurized, the arm 44 will be driven back to the neutral central position by the ball 52 and spring 54.

If it is desired to downshift from Second gear to First gear, the passage 26 will be pressurized thereby pressurizing chamber 34 which will, of course, drive the arm 44 in the direction opposite to Arrow B and cause the shaft 14 of the one-way mechanism 10 to rotate opposite to Arrow A, thereby rotating the valve 62 from the Second gear position to the First gear position. A shift from First to Neutral is attained in the same manner by pressurizing the chamber 34. Likewise, a shift from Neutral to Reverse is attained by pressurizing the chamber 34. In the alternative, the Reverse gear can be positioned simply by pressurizing a proper passage out of the pressure source and valve mechanism 28 in a well known manner.

It should be appreciated from the foregoing that a compact and effective rotary actuator is provided with an oscillating input member, namely arm 44 and an intermittent rotary output member, namely shaft 14, which is effective to drive a rotary valve 62 to the desired position, such that the proper distribution of hydraulic fluid will be attained within a power transmission.

I claim:

1. An actuator for driving a rotary valve comprising:

a one-way drive mechanism comprising a plurality of rolling members, an input member having a plurality of cam surfaces contacting respective rolling members and an output member contacting each rolling member;

means for controlling the direction of power transmission in said one-way drive mechanism;

an actuator arm for applying torque to said input member of said one-way drive mechanism to rotate said one-way drive mechanism, and means for urging rotation of said actuator to a neutral position in a direction opposite to the power transmitting direction;

a valve member drivingly connected to said one-way drive mechanism for movement thereby when said one-way drive mechanism is rotated in the power transmitting direction; and said controlling means including hydraulic power means for supplying hydraulic fluid to deactivate less than all of said rolling members and to simultaneously drive said actuator arm such that active ones of the rolling members will transmit rotary power to said output member to cause movement of said valve member.

2. An actuator for driving a rotary valve comprising:

a one-way drive mechanism comprising a plurality of rolling members, an input member, an output member, a plurality of first cam surfaces formed on one of said input or output members contacting respective rolling members to provide a drive connection between said input and output members in a first rotary direction and a plurality of second cam surfaces formed on one of said input or output members contacting respective rolling members to provide a drive connection between said input and output members in a second rotary direction;

means for controlling the direction of power transmission in said one-way drive mechanism;

an actuator arm for applying torque to said one-way drive mechanism selectively to rotate said one-way drive mechanism in the first or second rotary direction, and means for urging rotation of said actuator to a neutral position in a rotary direction opposite to the power transmitting rotary direction;

a valve member drivingly connected to said one-way drive mechanism for movement thereby when said one-way drive mechanism is rotated in the power transmitting direction; and said controlling means including hydraulic power means for supplying hydraulic fluid to deactivate less than all of said rolling members and to simultaneously drive said actuator arm such that active ones of the rolling members will transmit rotary power to said output member to cause movement of said valve member.

3. An actuator for driving a rotary valve comprising:

a one-way drive mechanism comprising, an input member, an output member and controllable one-way members connected between said input member and said output member for controlling the direction of the transmission of power therebetween;

means for controlling the power transmission capability of said one-way members;

an actuator arm for applying torque to said input member of said one-way drive mechanism to rotate said one-way drive mechanism, and means for urging rotation of said actuator to a neutral position in a direction opposite to the power transmitting direction;

a valve member drivingly connected to said output member of said one-way drive mechanism for movement thereby when said one-way drive mechanism is rotated in the power transmitting direction; and said controlling means including hydraulic power means for supplying hydraulic fluid to deactivate less than all of said one-way members and to simultaneously drive said actuator arm such that active ones of said one-way-members will transmit rotary power to said output member to cause movement of said valve member.

* * * * *